(12) United States Patent
Lail et al.

(10) Patent No.: US 9,839,875 B2
(45) Date of Patent: Dec. 12, 2017

(54) REGENERABLE SOLVENT MIXTURES FOR ACID-GAS SEPARATION

(75) Inventors: Marty Lail, Raleigh, NC (US); Luke Coleman, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 22 days.

(21) Appl. No.: 13/819,975

(22) PCT Filed: Sep. 2, 2011

(86) PCT No.: PCT/US2011/050442
§ 371 (c)(1),
(2), (4) Date: Feb. 28, 2013

(87) PCT Pub. No.: WO2012/031274
PCT Pub. Date: Mar. 8, 2012

(65) Prior Publication Data
US 2013/0164199 A1    Jun. 27, 2013

Related U.S. Application Data

(60) Provisional application No. 61/379,827, filed on Sep. 3, 2010.

(51) Int. Cl.
*B01D 53/14* (2006.01)
*B01D 53/40* (2006.01)

(52) U.S. Cl.
CPC ......... *B01D 53/40* (2013.01); *B01D 53/1425* (2013.01); *B01D 53/1456* (2013.01); *B01D 53/1493* (2013.01); *B01D 53/1475* (2013.01); *B01D 2252/202* (2013.01); *B01D 2252/20405* (2013.01); *B01D 2252/20421* (2013.01); *B01D 2252/20426* (2013.01); *B01D 2252/504* (2013.01); *B01D 2257/30* (2013.01); *B01D 2257/302* (2013.01); *B01D 2257/308* (2013.01);
(Continued)

(58) Field of Classification Search
USPC .......................................................... 423/220
See application file for complete search history.

(56) References Cited

U.S. PATENT DOCUMENTS 6,036,931 A   3/2000   Yoshida et al.
7,982,069 B2  7/2011   Jessop et al.
(Continued)

FOREIGN PATENT DOCUMENTS

EP   1582250    10/2005
EP   2 589 424   8/2013
(Continued)

OTHER PUBLICATIONS

San-Pro Limited, DBU product, 2009.*
(Continued)

*Primary Examiner* — Anita Nassiri Motlagh
(74) *Attorney, Agent, or Firm* — Womble Bond Dickinson (US) LLP

(57) ABSTRACT

A solvent system comprising an ionic Liquid formed from a relatively acidic component and a nitrogenous base for the removal of acid gases from mixed gas streams is provided. Also provided is a process for removing acid gases from mixed gas streams using the disclosed solvent system. The solvent system may be utilized within a gas processing system.

11 Claims, 12 Drawing Sheets

$$\underset{\text{non-ionic solution}}{\overset{R^2}{\underset{R_1}{N}}-H + HO-R_3} \rightleftharpoons \underset{\text{ionic liquid}}{\overset{R^2}{\underset{R_1}{N^+}}-H + O^--R_3} \xrightarrow{CO_2} \overset{R^2}{\underset{R_1}{N^+}}-H \overset{O}{\underset{H}{\overset{\|}{O-C-O-R_3}}}$$

ionic liquid of carbonate ester

(52) U.S. Cl.
CPC .. *B01D 2257/404* (2013.01); *B01D 2257/504* (2013.01); *B01D 2258/0283* (2013.01); *Y02C 10/06* (2013.01)

(56) References Cited

U.S. PATENT DOCUMENTS

| | | |
|---|---|---|
| 2006/0226072 A1 | 10/2006 | Wyse et al. |
| 2007/0264180 A1 | 11/2007 | Carrette et al. |
| 2007/0286783 A1 | 12/2007 | Carrette et al. |
| 2009/0099269 A1 | 4/2009 | Rigby et al. |
| 2009/0136402 A1 | 5/2009 | Heldebrant et al. |
| 2009/0220397 A1 | 9/2009 | Heldebrant et al. |
| 2009/0291872 A1 | 11/2009 | Bara et al. |
| 2009/0291874 A1 | 11/2009 | Bara et al. |
| 2011/0293498 A1 | 12/2011 | Lahary et al. |

FOREIGN PATENT DOCUMENTS

| | | |
|---|---|---|
| FR | 2909010 | 5/2008 |
| JP | 2003-261315 | 9/2003 |
| JP | 2007-039387 | 2/2007 |
| JP | 2007-222847 | 9/2007 |
| JP | 2008-296211 | 12/2008 |
| JP | 2010-015933 | 1/2010 |
| JP | 2011-521778 | 7/2011 |
| WO | WO 98/32520 | 7/1998 |
| WO | WO 2009/143376 | 11/2009 |

OTHER PUBLICATIONS

Heldebrant et al., "CO2-binding organic liquids (CO2BOLs) for post-combustion CO2 capture", Energy Procedia, 1 (2009) 1187-1195.*

Jiang et al., "Carbon Dioxide Capture by Superbase-Derived Protic Ionic Liquids", Angew. Chem. Int. Ed. 2010, 49, 5978-5981.*

Kaupmees et al., "Basicities of Strong Bases in Water: A Computational Study", Croat. Chem. Acta 87 (4) (2014) 385-395.*

Wang et al., "Reversible and robust CO2 capture by equimolar task-specific ionic liquid-superbase mixtures", Green Chem., 2010, 12, 870-874.*

Lie et al., "New Force Field for Molecular Simulation of Guanidinium-Based Ionic Liquids", J. Phys. Chem. B 2006, 110, 12062-12071.*

Luo et al., "Equimolar CO2 capture by imidazolium-based ionic liquids and superbase systems", Green Chem., 2010, 12, 2019-2023.*

Baric et al., "Towards the Strongest Neutral Organic Superbases Based on Intramolecular H-bonds", Croat. Chem. Acta 87 (4) (2014) 459-464.*

Raab et al., "1 8-Bis(tetramethylguanidino)naphthalene (TMGN): A New, Superbasic and Kinetically Active Proton Sponge", Chemistry: A European Journal 2002, 8, No. 7, 1682-1693.*

Vitorino et al., "Thermochemistry of 1,1,3,3-tetramethylguanidine and 1,1,3,3-tetramethylguanidine nitrate", J. Chem. Thermodynamics 77 (2014) 179-189.*

Kore, "Table of proton affinities in alphabetical order", Kore Technology Limited 2012.*

Julian et al., "The Unusually High Proton Affinity of Aza-18-Crown-6 Ether: Implications for the Molecular Recognition of Lysine in Peptides by Lariat Crown Ethers", American Society for Mass Spectrometry 2002, 13, 493-498.*

Wang et al. "Carbon Dioxide Capture by Superbase-Derived Protic Ionic Liquids," *Angewandte Chemie International Ediction*, 2010, pp. 5978-5981, vol. 49, No. 34.

Gwinner et al., "CO2 Capture in Flue Gas: Semiempirical Approach to select a Potential Physical Solvent," *Ind. Eng. Chem. Res.* 2006, pp. 5044-5049, vol. 45.

Wikipedia—TMG (hhttps://en.wikipedia.org/wiki/1,1,3,3-tetramethylguanadine [Sep. 10, 2015 2:37:13 PM]).

Versteeg et al, "On the Kinetics Between CO2 and Alkanolamines Both in Aqueous and Non-Aqueous Solutions—I. Primary and Secondary Amines," *Chemical Engineering Science*, 1988, vol. 43, No. 3, pp. 573-585.

Human Metabolome Database: Showing Metabocard for Diethylamine (HMD41878). Created Sep. 13, 2012 and updated Feb. 11, 2016.

* cited by examiner

REGENERABLE SOLVENT MIXTURES FOR ACID-GAS SEPARATION

FIELD OF THE INVENTION

The present invention relates to solvent systems for the removal of specific components of gas streams, as well as devices and methods using such systems. More specifically, the invention can provide for removal of acid gases, such as $CO_2$, $SO_2$, COS, $CS_2$ and NOx. The invention further can provide for continuous operation of devices and methods using the system. Further, the inventive methods can utilize multiple absorption/desorption means, including gas absorption/desorption or phase-enhanced absorption/desorption.

BACKGROUND OF THE INVENTION

Various strategies are being pursued to minimize the production and/or release of undesirable emissions from combustion processes. One such strategy is the development of technologies for the specific removal of acid gases from gas mixtures, such as the exhausts of carbon combustion processes. The separation of acid gases, such as $CO_2$, from gas mixtures has been carried out industrially for over a hundred years, although no known process has been used on a large scale such as that required by large, industrial power plants. Of the numerous processes used for $CO_2$ separation, current technology mainly focuses on the use of various solvents, such as alkali carbonates in the BENFIELD™ Process (UOP, LLC), alcoholamines in the ECONAMINE FG PLUS™ process (Fluor Corporation), and alcohols, diols, and ethers in the RECTISOL® process (Lurgi, GMBH) and the SELEXOL™ solvent (The Dow Chemical Company). In a typical solvent-based process, the gas mixture to be treated is passed through a liquid solvent that interacts with acidic compounds in the gas stream (e.g., $CO_2$ and $SO_2$) and separates them from non-acidic components. The liquid becomes rich in the acid-gas components, which are then removed under a different set of operating conditions so that the solvent can be recycled for additional acid-gas removal.

Methods for removal of the acid-gas components from rich solvents involve pressure and temperature change Depending on the temperature of the gas mixture and the partial pressure of the acid-gas in the mixture, certain solvents are preferred for specific applications. When a solvent operates by chemical absorption, an exothermic chemical reaction with the acid-gas occurs. The reversal of this reaction requires at least the amount of energy to be added back to the rich solvent that was produced by the forward reaction, not to mention the energy needed to bring the rich solvent to the temperature where reversal is appreciable and to maintain conditions to complete the reverse reaction to an appreciable extent. The energy required to obtain purified acid-gas from the rich solvent contributes to the cost of the purified product. In particular, the cost of the purified acid-gas has become a significant hurdle for the application of solvent technologies to fossil-fuel fired power plants for the removal of acid gases from flue gas.

Non-aqueous solvents have been used to remove $CO_2$ from natural gas streams and require less energy for regeneration. Single-component alcoholic physisorption solvents such as RECTISOL™ and SELEXOL® are commercially available for $CO_2$ separation but perform poorly in the humid, near-ambient pressure conditions associated with flue gas. Alcoholamines and amines have been combined with alcohols, diols, and cyclic carbonates by various researches to form "hybrid solvents" whose reaction mechanisms and kinetics have been studied in the literature. See, Alvarez-Fuster, et al., *Chem. Eng. Sci.* 1981, 36, 1513; Ali, et al., *Separation and Purification Technology* 2000, 18, 163; Usubharatana, et al., *Energy Procedia* 2009, 1, 95; and Park, et al., *Sep. Sci. Technol.* 2005, 40, 1885. In addition, a process known as the "phase-transitional absorption method" has been disclosed in relation to methods for deacidizing gaseous mixtures, which generally consists of the absorption of acid gases into an "absorbing phase" of less density than water consisting of a nitrogenous base and an alcohol, followed by transfer of the absorbed acid gas into an aqueous "carrier phase". The aqueous carrier phase can be regenerated in a regenerator. The process claims to save energy by absorbing an acid gas at a faster rate than in an absorbing phase alone, and by avoiding the energy required to pump a rich absorbing phase to a separate regenerator by utilizing gravity to transfer the acid gas between phases in a single column for absorption and regeneration.

Ionic liquids are another non-aqueous solvent currently being developed. These solutions consist completely of ion pairs which are in the liquid state near room temperature. They have low regeneration requirements but have not surpassed aqueous amine solvents in performance due to factors including $CO_2$ loading capacity, viscosity, cost, and, importantly, degradation by water. Using a non-aqueous liquid solvent to separate $CO_2$ from gas mixtures containing water vapor can lead to the accumulation of $H_2O$ in the liquid solution either as a single-phase or bi-phase solution, depending upon the process conditions (e.g., pressure, temperature, $H_2O$ concentration) and the affinity of the non-aqueous solvent for $H_2O$. $H_2O$ accumulation is detrimental to the $CO_2$ separation and purification process, since more energy will be required for solvent regeneration due to the necessity of continually removing water from the solvent.

Another group of non-aqueous liquids which could be developed to address many of the problems affecting $CO_2$ solvents are the room temperature switchable ionic liquids. These equimolar mixtures of amidine or guanidine nitrogen bases and alcohols are non-ionic room temperature liquids that react with $CO_2$ to form room-temperature ionic liquids. Typically, the conductivity of equimolar mixtures increases by one or two orders of magnitude when $CO_2$ is added Importantly, these solvents have higher $CO_2$ loadings than some aqueous amines, and are regenerable under milder conditions. While these solvents are a promising alternative technology, those that have been previously disclosed are poorly suited for flue gas applications due to their chemistries with respect to water, which typically is a major component of flue gas. $CO_2$ is captured via the formation of amidinium and guanidinium alkyl carbonate salts derived from the conjugate bases of the deprotonated alcohol components. However, if the conjugate base of the alcohol is a weaker acid than water, an acid-base equilibrium is established between the alcohol-conjugate base and water, which favors deprotonation of water and reformation of the protonated alcohol. The conjugate base of water, the hydroxide ion, reacts favorably with $CO_2$ to form a bicarbonate anion, which requires more energy to reverse than alkyl carbonate anions.

Accordingly, it would be beneficial to formulate a new solvent system capable of effectively removing acid gases from gas streams (particularly water-containing gas streams) and which can be regenerated at a lower temperature and energy load than the solvents currently utilized for such purposes.

SUMMARY OF THE INVENTION

In one aspect, the present invention relates to a solvent system for the removal of acidic gases, such as $CO_2$, from a gas stream. In some embodiments, a solvent system according to the invention comprises a nitrogenous base and an acidic component. Specifically, the acidic component may have a pKa of less than about 15.

In some embodiments, the invention provides a solvent system for the removal of acidic gaseous components (e.g., $CO_2$, $SO_2$, and $NO_2$) from a gas stream, wherein the solvent system can be described as a non-reversible ionic liquid comprising a nitrogenous base and an acidic component having a pKa of less than about 15, which reacts with said acid gaseous components to form a carbonate ester or heteroatom analogue of a carbonate ester, and further wherein said acid gaseous components reversibly bind with the ionic liquid solvent to form an ionic liquid product.

In some embodiments, the invention provides a solvent system comprising an ionic liquid formed from: the conjugate base of an acidic component, wherein the acidic component has a pKa of less than about 15; and the conjugate acid of a nitrogenous base selected from the group consisting of amidines, guanidines, and combinations thereof; wherein the conjugate base of the acidic component has a structure such that it can react with an acidic gas so as to form a carbonate ester or a heteroatom analogue of a carbonate ester. The components of the ionic liquid can vary.

For example, in certain embodiments, the acidic component is selected from the group consisting of fluorinated alcohols, optionally substituted phenols, nitrogen heterocycles, and mixtures thereof. In specific embodiments, the acidic component includes, but is not limited to, 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 3-fluorophenol; 3-trifluoromethylphenol; and mixtures thereof.

In certain embodiments, the amidine, guanidine, or combinations thereof has a pKa of about 12 to about 15. Certain amidines and/or guanidines that may be particularly useful according to the present invention include amidines and guanidines wherein one or more hydrogen atoms are replaced with fluorine atoms. In specific embodiments, the amidines and guanidines are selected from the group including, but not limited to, 1,1,3,3-tetramethylguanidine ("TMG"), N-tert-butyl-1,1,3,3-tetramethylguanidine, diphenylguanidine, ditolylguanidine, and 1,8-diazabicyclo(5.4.0)undec-7-ene.

In certain embodiments, the solvent system can be characterized in terms of its conductivity. For example, the solvent system may be described as having a conductivity greater than about 100 microsiemens/$cm^2$, higher than about 200 microsiemens/$cm^2$, higher than about 250 microsiemens/$cm^2$, higher than about 300 microsiemens/$cm^2$, higher than about 350 microsiemens/$cm^2$, or higher than about 400 microsiemens/$cm^2$. The solvent system can, in certain embodiments, be characterized as immiscible with water. For example, in some embodiments, the solvent system has a solubility with water of less than about 10 g of solvent per 100 mL of water.

In another aspect of the invention is provided a method for the removal of acid gas components using the solvent systems described herein. For example, in some embodiments, the present invention can relate to a process for the removal of acid gas components from a gas stream by bringing the gas stream into contact with a solvent system comprising an ionic liquid formed from: the conjugate base of an acidic component, wherein the acidic component has a pKa of less than about 15; and the conjugate acid of a nitrogenous base selected from the group consisting of amidines, guanidines, and combinations thereof; wherein the conjugate base of the acidic component has a structure such that it can react with the acidic gaseous components so as to form a carbonate ester or a heteroatom analogue of a carbonate ester. In specific embodiments, the gas stream may contain water. Preferably, the absorbed acidic gas does not react with water to an appreciable extent to form a water-derived compound (e.g., a bicarbonate anion in the embodiment wherein $CO_2$ is removed).

In specific embodiments, contacting the gas stream with a solvent system according to the invention can cause formation of a solvent having a higher density than water. Specifically, such higher density solvent can form a bi-phase mixture in the presence of water (for example where the lower phase is an organic phase). In other embodiments, water present in the system particularly does not accumulate in the absorber column. In further embodiments, the inventive processes can include capturing the acidic gas. Moreover, an acid-gas rich solvent formed after contact with the acid gas can be sent to a regenerator for removal of the acid-gas components.

In certain embodiments, the acidic gas is captured in a non-aqueous phase under conditions in which water accumulates as a separate, lower density phase. This phase can be sent to the regenerator with the rich, non-aqueous phase to be regenerated at a lower temperature than the corresponding rich aqueous phase alone. This can be followed by phase separation from the lean, regenerated solvent before being sent back to the absorber.

DETAILED DESCRIPTION OF THE INVENTION

Figure 1:
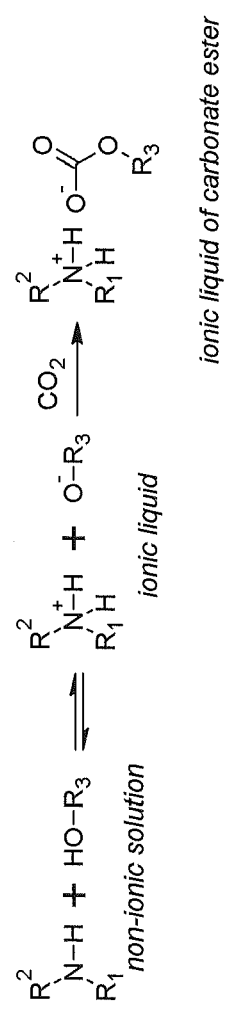
FIG. 1 is a scheme showing a reaction pathway employed for capturing $CO_2$ using solvent mixtures comprising an ionic liquid formed from an acid component and a nitrogenous base.
Figure 2:
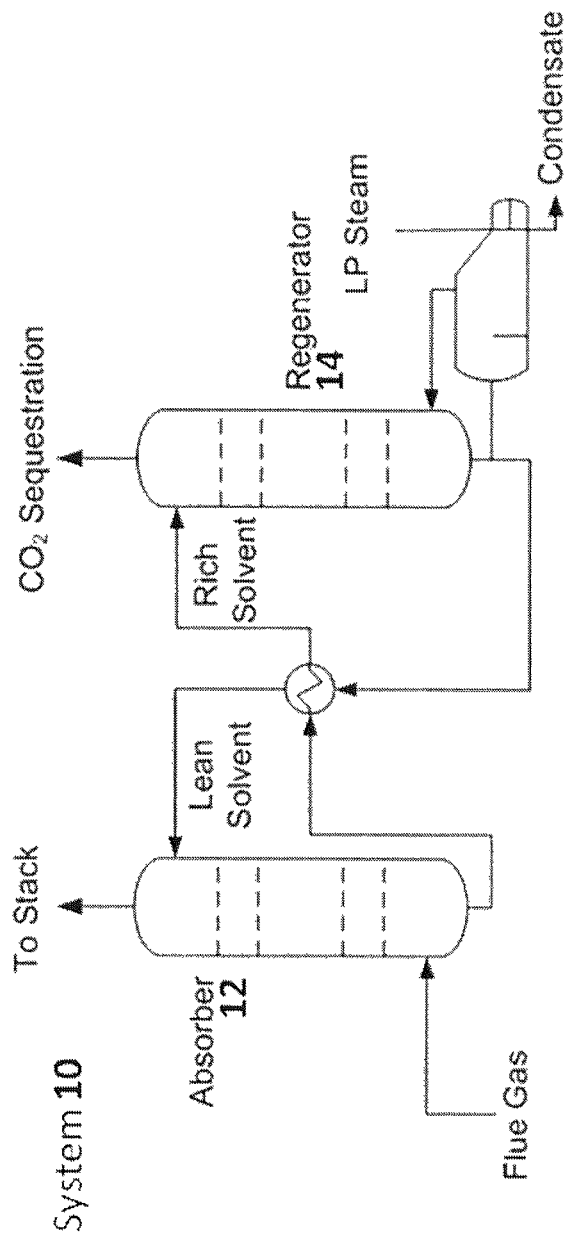
FIG. 2 is a diagram of a reboiler-based system embodied by the present invention for the capture and regeneration of acidic gases from a mixed gas stream.
Figure 3:
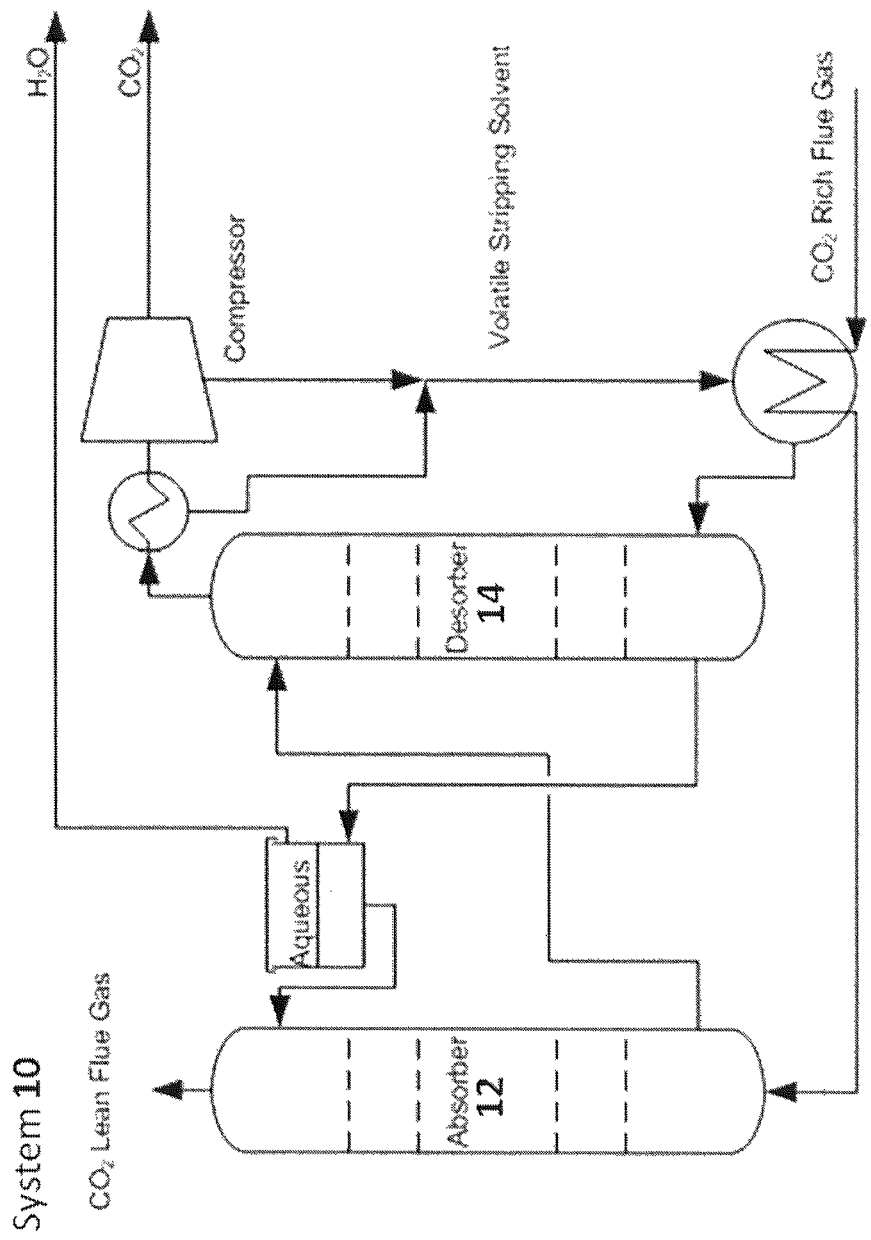
FIG. 3 is a diagram of a reboiler-free system embodied by the present invention for the capture of acidic gases from a mixed gas stream.
Figure 4:
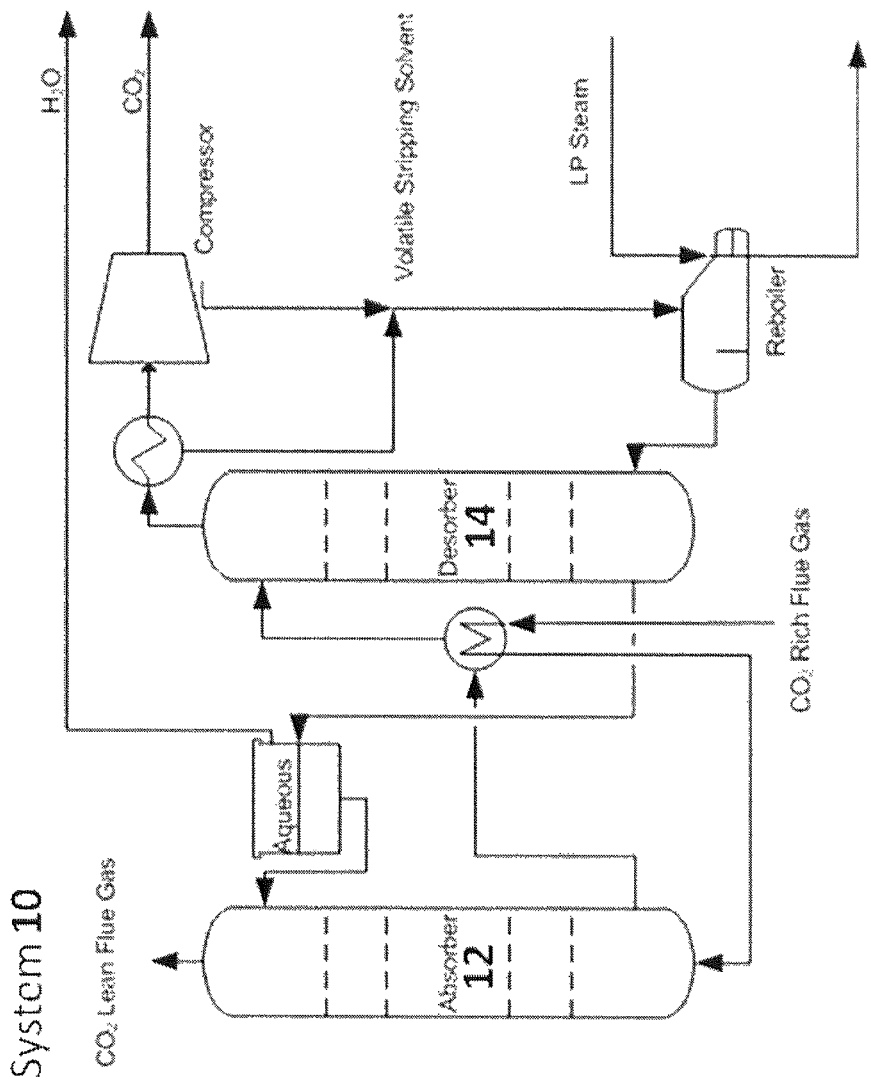
FIG. 4 is a diagram of a reboiler-assisted system embodied by the present invention for the capture of acidic gases from a mixed gas stream.
Figure 5:
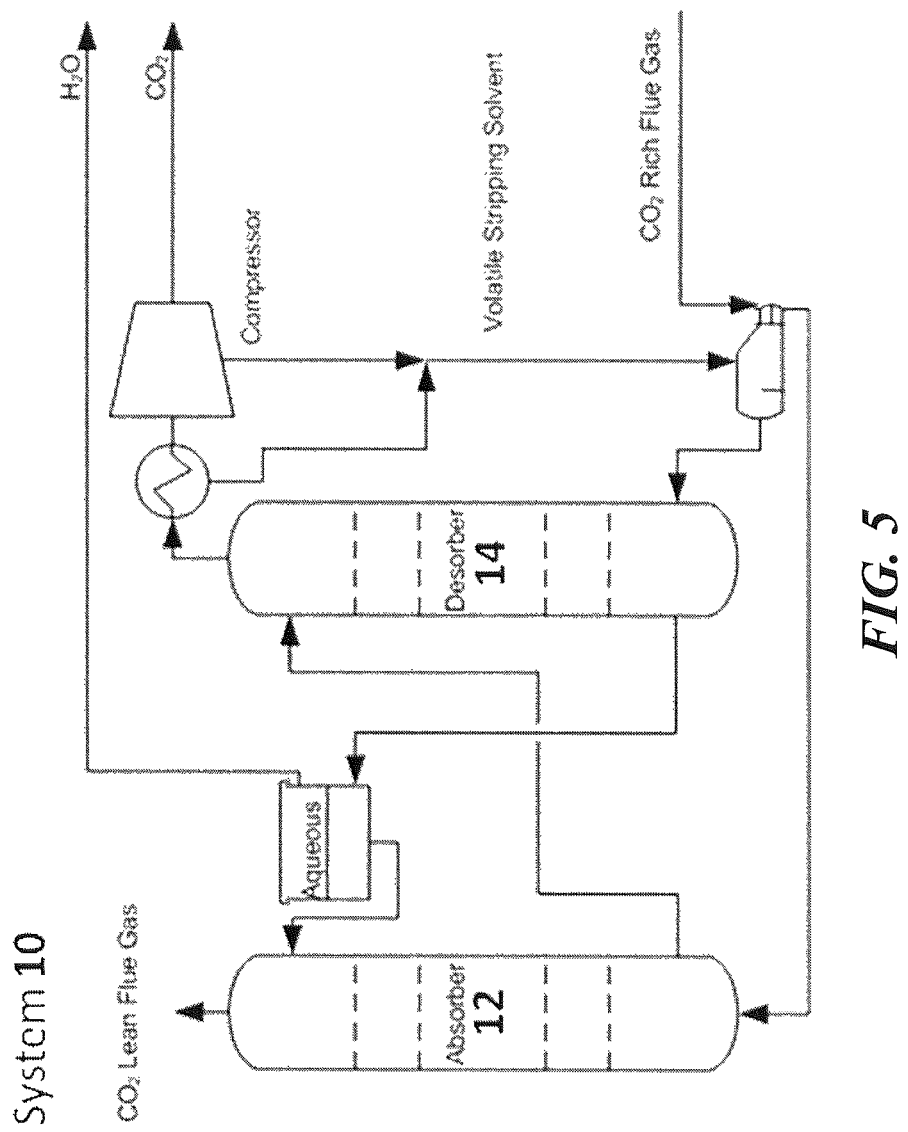
FIG. 5 is a diagram of a waste heat reboiler system embodied by the present invention for the capture of acidic gases from a mixed gas stream.
Figure 6:
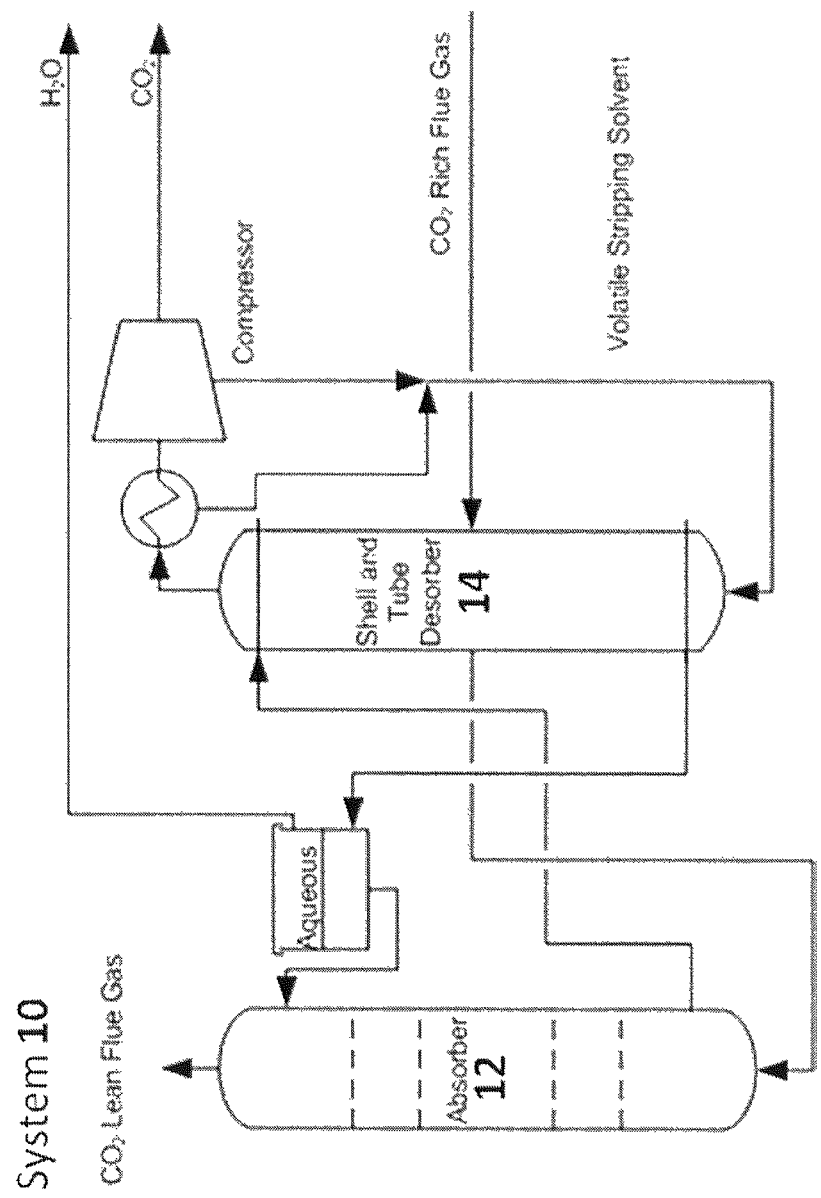
FIG. 6 is a diagram of a waste heat utilization system embodied by the present invention for the capture of acidic gases from a mixed gas stream.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements. As used in this specification and the claims, the singular forms "a," "an," and "the" include plural referents unless the context clearly dictates otherwise.

In one aspect of the present invention is provided a liquid solvent system. The solvent system may be used for the separation of acidic gases from gas mixtures. The term "acid gas" is intended to refer to any gas component that can result in formation of an acid when mixed with water. Non-limiting examples of acid gases encompassed by the present invention include $CO_2$, $SO_2$, $CS_2$, and COS. For simplicity, the invention is described below in relation specifically to $CO_2$. It is understood, however, that the present invention encompasses methods and systems for removal of any acid gas component from a gas stream.

In certain embodiments, the solvent system is regenerable in that the acidic gases can be released from the solvent, and the solvent can be reused to separate additional acidic gases from further gas mixtures. In particular embodiments, the solvent system is regenerable at temperatures lower than those typically required for solvents used for such purposes.

In some embodiments, the solvent system of the present invention comprises a mixture of a nitrogenous base component with a relatively acidic component. The term "relatively acidic component" as used herein is interchangeable with the term "acidic component" and is understood to mean a material having an acidity that is greater than the acidity of water, preferably substantially greater than the acidity of water. For example, in some embodiments, the acidic component can have a pKa of less than about 15, less than about 14, less than about 13, less than about 12, less than about 11, or less than about 10. In some embodiments, the relatively acidic component has a pKa of about 9 to about 15, about 10 to about 15, about 11 to about 15, about 12 to about 15, about 13 to about 15, about 9 to about 14, about 9 to about 13, about 9 to about 12, or about 9 to about 11, about 10 to about 12, about 10 to about 13, about 10 to about 14, about 11 to about 13, or about 11 to about 14.

Exemplary classes of relatively acidic components that may be used according to the invention include, but are not limited to the following: fluorinated alcohols; optionally substituted phenols; and nitrogen heterocycles. Particularly preferred are relatively acidic components selected from fluorinated alcohols and optionally substituted phenols. Fluorinated alcohols useful according to the invention may comprise any compound having the formula R—OH, where R is an alkyl group (e.g., $C_1$-$C_{10}$ alkyl, $C_1$-$C_8$ alkyl, $C_1$-$C_6$ alkyl, $C_2$-$C_{10}$ alkyl, $C_2$-$C_8$ alkyl, $C_2$-$C_6$ alkyl, $C_3$-$C_{10}$ alkyl, $C_3$-$C_8$ alkyl, or $C_3$-$C_6$ alkyl) and wherein one or more hydrogen atoms of the alkyl group is substituted with fluorine. In some embodiments, the number of hydrogen atoms replaced with fluorine can be two, three, four, five, six, seven, eight, nine, or even more as may be deemed useful. In further embodiments, one or more of the hydrogen atoms of the alkyl group may optionally be replaced with one or more other substituents, including, but not limited to, $C_1$-$C_6$ alkyl, $C_1$-$C_6$ alkoxy, and halo substituents. Optionally substituted phenols useful in the invention are understood to mean phenols wherein one or more of the hydrogen atoms on the phenyl ring may be replaced with a substituent. Non-limiting, exemplary replacement groups for one or more of the hydrogen atoms on the phenyl ring include $C_1$-$C_6$ alkyl, $C_1$-$C_6$ alkoxy, and halo. Nitrogen heterocycles are understood to mean any cyclic compound including at least one nitrogen atom in the ring structure (including but not limited to imidazoles, pyrazoles, and triazoles) and being optionally substituted such that one or more of the hydrogen atoms on the ring structure may be replaced with a substituent. In certain embodiments, at least one nitrogen atom in the ring structure has an acidic hydrogen atom with a pKa lower than about 15 (e.g., between about 8 and about 15). Non-limiting, exemplary replacement groups for one or more of the hydrogen atoms on the ring include $C_1$-$C_6$ alkyl, $C_1$-$C_6$ alkoxy, and halo.

In some specific embodiments, the relatively acidic component may be selected from the group consisting of: 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole, 2-fluorophenol, 3-fluorophenol, 4-fluorophenol, 2-trifluoromethylphenol, 3-trifluoromethylphenol, 4-trifluoromethylphenol, and mixtures thereof.

The nitrogenous base component is typically selected from relatively strong bases, such as amidines and guanidines. In certain embodiments, the nitrogenous base is a guanidine, which is understood to be a compound of the structure $RNC(NR_1R_2)_2$, wherein R, $R_1$, and $R_2$ are independently H or carbon-containing groups, including but not limited to $C_1$-$C_{20}$ alkyl. One or more of the hydrogen atoms on R, $R_1$, and/or $R_2$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

In certain embodiments, the nitrogenous base is an amidine, including but not limited to a carboxamidine/carboximidamide, which is understood to be a compound of the structure $RC(=NH)NR_1R_2$, wherein R, $R_1$, and $R_2$ are independently H or carbon-containing groups, including but not limited to $C_1$-$C_{20}$ alkyl. One or more of the hydrogen atoms on R, $R_1$, and/or $R_2$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

In more specific embodiments, the nitrogenous base may be selected from the group consisting of 1,1,3,3-tetramethylguanidine ("TMG"); N-tert-butyl-1,1,3,3-tetramethylguanidine, diphenylguanidine, ditolylguanidine, or 1,8-diazabicyclo(5.4.0)undec-7-ene. Other exemplary guanidines that may be useful in certain embodiments according to the present invention include, but are not limited to, 1,1,3-trimethyl-3-(2,2,3,3-tetrafluoropropyl)guanidine; 1,1,3-trimethyl-3-(2,2,3,3,3-pentafluoropropyl)guanidine; 1,3-dimethyl-1,3-bis(2,2,2-trifluoroethyl)guanidine; 1,3-bis(2,2,3,3-tetrafluoropropyl)guanidine; 1,3-bis(4-fluorophenyl)guanidine; 1,3-bis(3-fluorophenyl)guanidine, and 1,3-bis(2-fluorophenyl)guanidine. Other amidines that may be useful in certain embodiments according to the invention are 2-(2,2,2-trifluoroethyl)-1,4,5,6,-tetrahydropyrimidine; 2-(2,2,3,3-tetrafluoropropyl)-1,4,5,6,-tetrahydropyrimidine; 3,3,4,4-tetrafluoro-N,N-dimethylbutanimidamide; and 3,3,3-trifluoro-N,N-dimethylpropanimidamide. Still other nitrogenous bases that may be used according to the present invention include, for example, those disclosed in U.S. Patent Application Publication No. 2008/0058549 to Jessop et al., the disclosure of which is incorporated herein by reference. In certain embodiments, the nitrogenous base can have a pKa of about 12 to about 15, about 12 to about 14, or about 13 to about 15. For example, in some embodiments, the nitrogenous base can have a pKa of about 12, about 13, about 14, or about 15.

In some embodiments, the solvent system may include a mixture comprising a nitrogenous base and a relatively acidic alcohol, which components may be present in roughly equal proportions by molarity (i.e. are present in equimolar amounts). In some embodiments, the solution may be diluted, such as with water or by using an excess of the relatively acidic component. For example, the molar ratio of nitrogenous base to relatively acidic component can be 1.1 to about 20, 1.1 to about 15, 1.1 to about 10, 1.1 to about 5, 1.1 to about 3, about 2 to about 20, about 2 to about 15, 2 to about 10, 2 to about 5, about 3 to about 20, about 3 to about 15, about 3 to about 10, about 4 to about 20, about 4 to about 15, about 4 to about 10, about 5 to about 20, about 5 to about 15, or about 5 to about 10. Although not wishing to be bound by theory, it is believed that the use of the diluent can be useful to reduce or prevent precipitation of solids in the solvent system. In some embodiments, the solvent system may further comprise one or more additional components. The additional components may be added, for example, to increase the solubility of the captured $CO_2$ product in the solvent system, and thus avoid the formation of precipitates. In other embodiments, however, solids formation may be desirable, and such formation may be enhanced by altering the concentration of one or more solvent components.

In some embodiments, the solvent system of the present invention is particularly useful for capturing $CO_2$ from a gas stream. The gas stream may be a mixed gas stream, having one or more other components in addition to $CO_2$. When a solution comprising a solvent system of the present invention is purged with a gas mixture containing $CO_2$, the components of the solvent system undergo a chemical reaction with $CO_2$, binding the $CO_2$ in the solution. In some embodiments, the solvent systems of the present invention have high $CO_2$ loadings. For example, the solvent systems may be useful for capturing or removing greater than about 0.05 moles $CO_2$ per mole of nitrogenous base, greater than about 0.1 moles $CO_2$ per mole of nitrogenous base, greater than about 0.2 moles $CO_2$ per mole of nitrogenous base, greater than about 0.3 moles $CO_2$ per mole of nitrogenous base, greater than about 0.4 moles $CO_2$ per mole of nitrogenous base, greater than about 0.5 moles $CO_2$ per mole of nitrogenous base, greater than about 0.6 moles $CO_2$ per mole of nitrogenous base, greater than about 0.7 moles $CO_2$ per mole of nitrogenous base, greater than about 0.8 moles $CO_2$ per mole of nitrogenous base, greater than about 0.9 moles $CO_2$ per mole of nitrogenous base, or greater than about 1 mole $CO_2$ per mole of nitrogenous base.

FIG. 1 illustrates reaction pathways for capturing $CO_2$ using ionic liquids comprising a relatively acidic alcohol and a nitrogenous base. The reversible capture of $CO_2$ according to this process involves reaction with an ionic liquid formed from the conjugate base of the alcohol and the conjugate acid of the nitrogenous base. In FIG. 1, the nitrogenous base is shown to react with an acidic nucleophile (alcohol) to deprotonate the alcohol and form the ionic liquid. The solvent system can be classified as an ionic liquid by any means known in the art. For example, the solvent system can be determined to have a conductivity greater than about 100 microsiemens/$cm^2$. For example, in preferred embodiments, the solvent system has a conductivity greater than about 400 microsiemens/$cm^2$. The ionic liquid is capable of capturing $CO_2$ as a carbonate ester. It is noted that, by varying the acid gas being removed from the system, the structure of the captured product will necessary vary as well. Therefore, in certain embodiments, the acid gas will be captured as a heteroatom analogue of a carbonate ester.

The solvent system of the present invention is designed such that the relatively acidic component (e.g., an alcohol in the above embodiment) is more acidic than water, and thus its conjugate base is comparatively less susceptible to protonation by water. Thus, the present invention improves upon the impact of chemical degradation by water which exists for some non-aqueous solvents. The reaction of the disclosed solvent system with $CO_2$ is fully reversible under certain conditions. For example, the reaction is reversible under elevated $CO_2$ pressure and elevated temperature (e.g., when heated to about 50° C. and above).

In certain embodiments, the relatively acidic component is selected such that it has low miscibility with water. For example, in some embodiments, the relatively acidic component has a solubility of less than or equal to about 10 g/100 mL in water at 25° C. (i.e., 10 g of solvent per 100 mL of water). In other embodiments, the relatively acidic component has a solubility in water of less than or equal to about 0.01 g/100 mL, less than or equal to about 0.1 g/100 mL, less than or equal to about 0.5 g/100 mL, less than or equal to about 1 g/100 mL, less than or equal to about 1.5 g/100 mL, less than or equal to about 2 g/100 mL, less than or equal to about 2.5 g/100 mL, less than or equal to about 3 g/100 mL, less than or equal to about 4 g/100 mL, less than or equal to about 5 g/100 mL, less than or equal to about 6 g/100 mL, less than or equal to about 7 g/100 mL, less than or equal to about 8 g/100 mL, or less than or equal to about 9 g/100 mL in water at 25° C. In some embodiments, the relatively acidic component is completely immiscible with water. Using relatively acidic components with low water solubility may result in solvent systems that display one or more of the following attributes: they may require less energy for regeneration; may have high $CO_2$ loading capacities; may be able to tolerate water in the gas stream; and/or may be able to be separated from water without a large energy penalty.

In additional embodiments, the nitrogenous base component of the solvent system is similarly selected such that it has low miscibility with water. In preferred embodiments, the nitrogenous base has higher miscibility with the relatively acidic component than with water. In some embodiments, the nitrogenous base has high solubility in the relatively acidic component. Examples of such nitrogenous bases include, but are not limited to, guanidines or amidines, such as those having one or more substituted or unsubstituted hydrocarbon chains, one or more substituted or unsubstituted aromatic moieties (e.g., fluorine-substituted aromatic moieties), and/or one or more substituted or unsubstituted alkylaromatic moieties (e.g., fluorine-substituted alkylaromatic moieties).

In some embodiments, the solvent system is tolerant to the presence of water. In certain embodiments, the solvent system tolerates water up to or equal to about 30% water by volume. For example, in some embodiments, the solvent system tolerates up to or equal to about 25% water by volume, up to or equal to about 20%, up to or equal to about 15%, up to or equal to about 10%, up to or equal to about 5%, up to or equal to about 2%, or up to or equal to about 1% water by volume. In some embodiments, tolerance to the presence of water means that there is little to no degradation of the solvent performance up to the indicated volume of water. In some embodiments, the solvent system maintains at or near its initial capacity for $CO_2$ loading up to the indicated volume of water.

In preferred embodiments, the $CO_2$ sequestered using the solvent system of the present invention may be released to regenerate the solvent system for reuse. It is preferred that the solvent system is regenerable using mild conditions. In some embodiments, the release of $CO_2$ and corresponding regeneration of the solvent system is effectuated by heating the solution. When the solution containing bound $CO_2$ is heated, the chemical reaction is reversed and the $CO_2$ is released, producing a concentrated $CO_2$ stream.

In some embodiments, the present application relates to a solvent system and process for the removal of $CO_2$ from a gas stream. The present invention applies to any gas stream containing $CO_2$. For example, in particular embodiments, the invention relates to a process for the removal of $CO_2$ from fossil fuel combustion flue gas, a natural gas mixture, or a mixture of respiration gases from closed environments containing $CO_2$. The process involves passing the mixed gas stream through a solvent system comprising a relatively acidic component and a nitrogenous base component. In some embodiments, the present invention further relates to the regeneration of the solvent system, which releases the $CO_2$. In some embodiments, regeneration of the solvent system involves heating the solvent system at a temperature sufficient to release the $CO_2$. In some embodiments, the process involves heating the solvent system at a temperature at or below about 200° C., for example, at or below about 185° C., at or below about 150° C., or at or below about 125° C. In preferred embodiments, the process involves heating the solvent system at a temperature at or below about 100° C., for example, at a temperature at or below about 95° C., at or below about 90° C., at or below about 85° C., at or below about 80° C., at or below about 75° C., or at or below about 70° C. For example, in some embodiments, wherein the relatively acidic component is a fluorinated alcohol, the $CO_2$ is captured as a fluoroalkylcarbonate, which may be decomposed to release $CO_2$ by heating the solvent system at a temperature between about 40° C. and about 85° C. In some embodiments, the $CO_2$ may be released at ambient temperature.

In certain embodiments, at or about 100% of the $CO_2$ is removed from the $CO_2$-rich solvent system. However, in other embodiments, less than 100% of the $CO_2$ is removed from the $CO_2$-rich solvent system. In preferred embodiments, about 50 to 100% of the captured $CO_2$ is removed from the $CO_2$-rich solvent system, preferably about 75% to 100%, about 80% to 100%, about 90% to 100%, about 95% to about 100%, or about 98% to 100%. For example, in some embodiments, at least about 98%, 95%, 90%, 85%, 80%, 75%, 70%, 60%, or 50% of the captured $CO_2$ is removed from the $CO_2$-rich solvent system.

In some embodiments, the removal of $CO_2$ from gas mixtures containing $H_2O$ in addition to $CO_2$ can lead to the accumulation of $H_2O$ in the solvent system, either as a single phase or biphase solution, depending upon the reaction conditions. As noted above, the presence of $H_2O$ in the solvent mixture may be disadvantageous because of an undesirable side reaction, and more energy will be required for solvent regeneration due to the necessity of removing water from the solvent. Thus, the accumulation of $H_2O$ in the solvent system may increase the regeneration energy demand, decreasing the efficiency of the regeneration system.

In some embodiments, the process of the present invention provides a method by which the detrimental effects of $H_2O$ accumulation in the solvent system may be avoided. For example, the detrimental effect of $H_2O$ accumulation on the solvent system regeneration energy demand may be minimized, by providing a process by which the $CO_2$ is sequestered within the solvent system at a temperature greater than the $H_2O$ saturation temperature of the gas mixture. Additionally, the detrimental effect of $H_2O$ accumulation on the solvent system regeneration energy demand may be minimized by providing a process by which the $H_2O$ accumulates as a separate, aqueous phase within the solvent system. This process involves the use of a solvent system that exhibits little or no solubility in water. In such a system, water that collects is present as a separate phase. The separate, aqueous phase may be decanted or centrifuged off by mechanical, rather than thermal, processes, minimizing the energy required to maintain an efficient $CO_2$ removal system. For example, as the hydrocarbon chain of aliphatic alcohols is increased in length, the solubility of the alcohol in water decreases. This is also true for fluorinated alcohols. For example, 2,2,3,3,4,4,5,5-octafluoropentanol ("OFP") is essentially immiscible with water. Thus, a solvent system comprising an appropriate nitrogen base and OFP forms a biphasic liquid solution when combined with water. In such a solvent, water can be separated from the solvent system without distillation or the use of a membrane by decanting or centrifugation of the aqueous layer from the fluorinated phase. In some embodiments, after removal of the $H_2O$, the $CO_2$-rich solvent system can be regenerated at a low temperature with the addition of low boiling diluents to satisfy the partial pressure requirements. The solvent system could thus avoid the added energy penalty associated with the distillation of water. By providing a non-aqueous $CO_2$ absorbing solvent system with low water solubility, the solvent system has lower energy demands and milder regeneration conditions than those of aqueous or high-water affinity $CO_2$ solvent systems.

In some embodiments, a system for the removal of $CO_2$ from a gas stream is provided. A schematic of an exemplary system of the present invention is depicted in FIGS. 2 through 6. The $CO_2$ removal system 10 includes an absorber 12 configured with an inlet to receive a gas stream. The gas stream may come directly from, e.g., a combustion chamber of a boiler system in a power generation plant. The gas stream may or may not be passed through other cleaning systems prior to entering the $CO_2$ removal system. The absorber may be any chamber wherein a solvent system for the removal of $CO_2$ is contained, having an inlet and outlet for a gas stream, and wherein the gas stream may be brought into contact with the solvent system. Within the absorber, the $CO_2$ may be transferred from gaseous phase to liquid phase according to the principles discussed herein. The absorber may be of any type; for example, the absorber may comprise a spray-tower absorber, packed-bed absorber (including countercurrent-flow tower or cross-flow tower), tray-tower absorber (having various tray types, including bubble-cap trays, sieve trays, impingement trays, and/or float valve trays), venture absorber, or ejector absorber. The temperature and pressure within the absorber may be controlled. For example, in one embodiment, the temperature of the absorber may be maintained at or near 50-60° C. and the absorber may be maintained at or near atmospheric pressure. Thus, the absorber may be equipped with a heating/cooling system and/or pressure/vacuum system.

Within the absorber, the gas stream is brought into fluid contact with and passed through a solvent system comprising a relatively acidic component and a nitrogenous base component. The solvent system reacts with the $CO_2$ present in the gas stream, sequestering it from the remaining components of the gas, and the resulting $CO_2$-free gas stream is released from the absorber through an outlet. The solvent system continues to react with entering $CO_2$ as the mixed gas stream is passed through, until it becomes "rich" with $CO_2$. The absorber is optionally connected to one or more components. For example, the absorber is preferably configured with a means for routing solvent to a unit wherein water may be decanted, centrifuged, or otherwise removed from the system.

At any stage in the process of $CO_2$ capture, the solvent system may be regenerated. The system therefore includes an optional regeneration system 14 to release the captured $CO_2$ via a separate $CO_2$ gas stream and thus regenerate the solvent system. The regeneration system is configured to receive a feed of "rich" solvent from absorber and to return regenerated solvent to the absorber once $CO_2$ has been separated from the "rich" solvent. The regeneration system may simply comprise a chamber with a heating unit to heat the solvent system at a temperature sufficient to release the gas, along with a release valve to allow the $CO_2$ to be removed from the regeneration system. It may also be a distillation column and have essentially the same design as described above for the absorption column. The regenerator may be optionally connected to one or more components. For example, the regenerator is preferably configured with a means for routing solvent to a unit wherein water may be decanted, centrifuged, or otherwise removed from the system.

The released $CO_2$ can be output to storage or for other predetermined uses. The regenerated solvent is again ready to absorb $CO_2$ from a gas stream, and may be directed back into the absorber.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

EXPERIMENTAL

The following examples are provided for the purpose of complete disclosure and are not to be viewed as limiting of the invention.

Example 1

Figure 7:
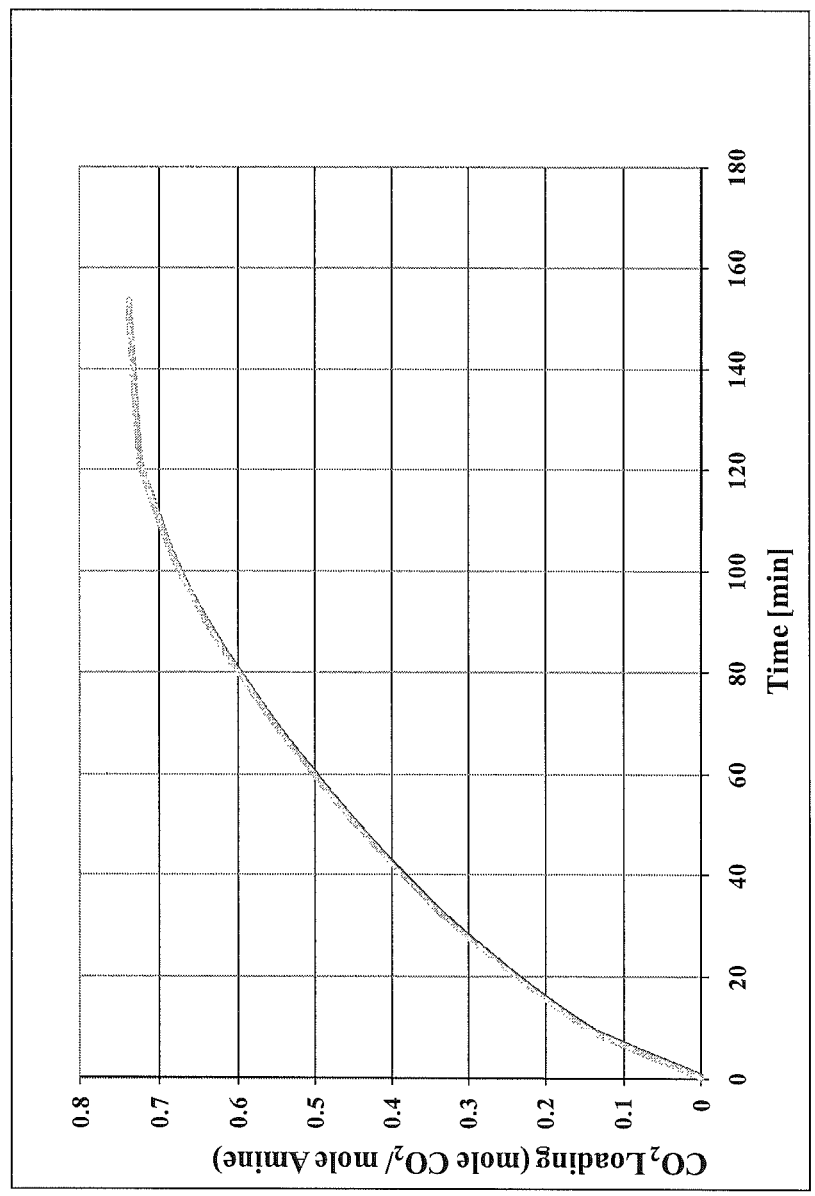
FIG. 7 is a $CO_2$ loading curve for an equimolar solution of 1,1,3,3,-tetramethylguanidine with 2,2,2-trifluoroethanol.

Absorption of $CO_2$ by 1,1,3,3-tetramethylguanidine/ 2,2,2-trifluoroethanol Resulting in Formation of a Carbonate Ester An equimolar solution of 1,1,3,3-tetramethylguanidine ("TMG") and 2,2,2-trifluoroethanol ("TFE") was prepared, resulting in an exothermic event with moderate generation of heat. The solution was placed in an impinger and purged with a binary gas mixture containing approximately 13% $CO_2$ (balance nitrogen). The $CO_2$ concentration of the gas exiting the reactor was monitored by an NDIR $CO_2$ analyzer. The $CO_2$ loading curve is shown in FIG. 7. Upon heating the solution to 80° C. in a flowing stream of nitrogen, the absorption was reversed, resulting in the release of approximately 0.56 moles $CO_2$/mole amine.

Figure 8:
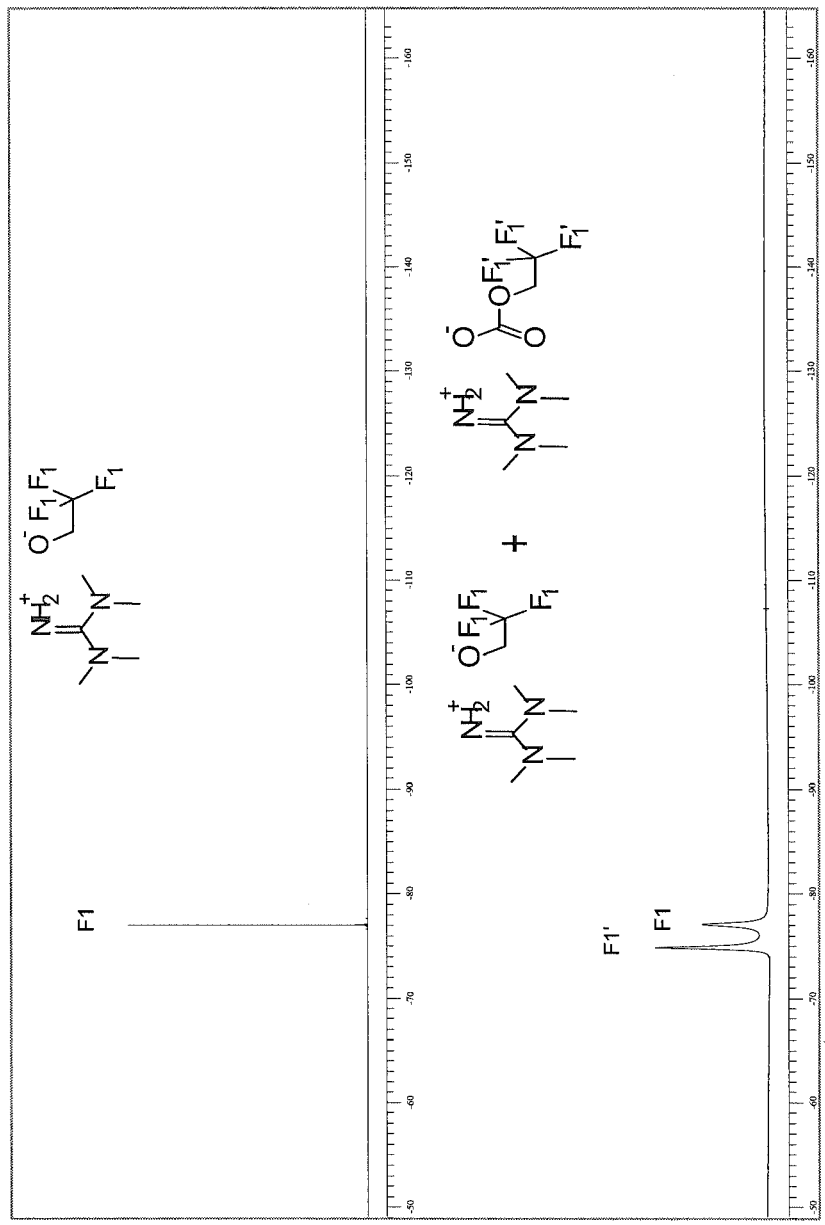
FIG. 8 is fluorine NMR spectra showing 1,1,3,3-tetramethylguanidine with 2,2,2-trifluoroethanol before (top) and after (bottom) reaction with $CO_2$, showing that a new fluorine resonance appears for the $CO_2$ containing carbonate ester product.

FIG. 8 provides a nuclear magnetic resonance (NMR) spectrum of the result of the reaction between the TMG/TFE solvent system and gaseous $CO_2$. In an NMR tube at room temperature, 1,1,3,3-tetramethylguanidine (0.6 mmol) was combined with 2,2,2-trifluoroethanol (0.6 mmol) in deuterated chloroform ($CDCl_3$, 0.6 grams). A $^{19}F$ NMR spectrum of the starting solution was recorded. A single resonance appeared in the NMR with chemical shift of approximately −77 ppm corresponding to the chemically equivalent fluorine environment, as shown in the upper portion of FIG. 8.

The NMR tube was then purged for 30 minutes with a gas mixture of 13.3% $CO_2$ and balance nitrogen. A second $^{19}F$ NMR spectrum was recorded at this time, shown at the bottom portion of FIG. 8. This spectrum clearly indicates the appearance of a new peak (indicative of a new fluorine-containing product), shifted approximately 3 ppm.

This data provides evidence that a carbonate ester was formed under the experimental conditions. When fluorine nuclei are present in alcoholic reactants (as they are here), fluorine NMR is a convenient handle to identify involvement of the alcohol in the capture of $CO_2$ as a carbonate ester. The formation of a new product which involves the alcohol will result in new $^{19}F$ resonances in the NMR spectrum. Fluorine spectra shown are proton decoupled.

Example 2

Figure 9:
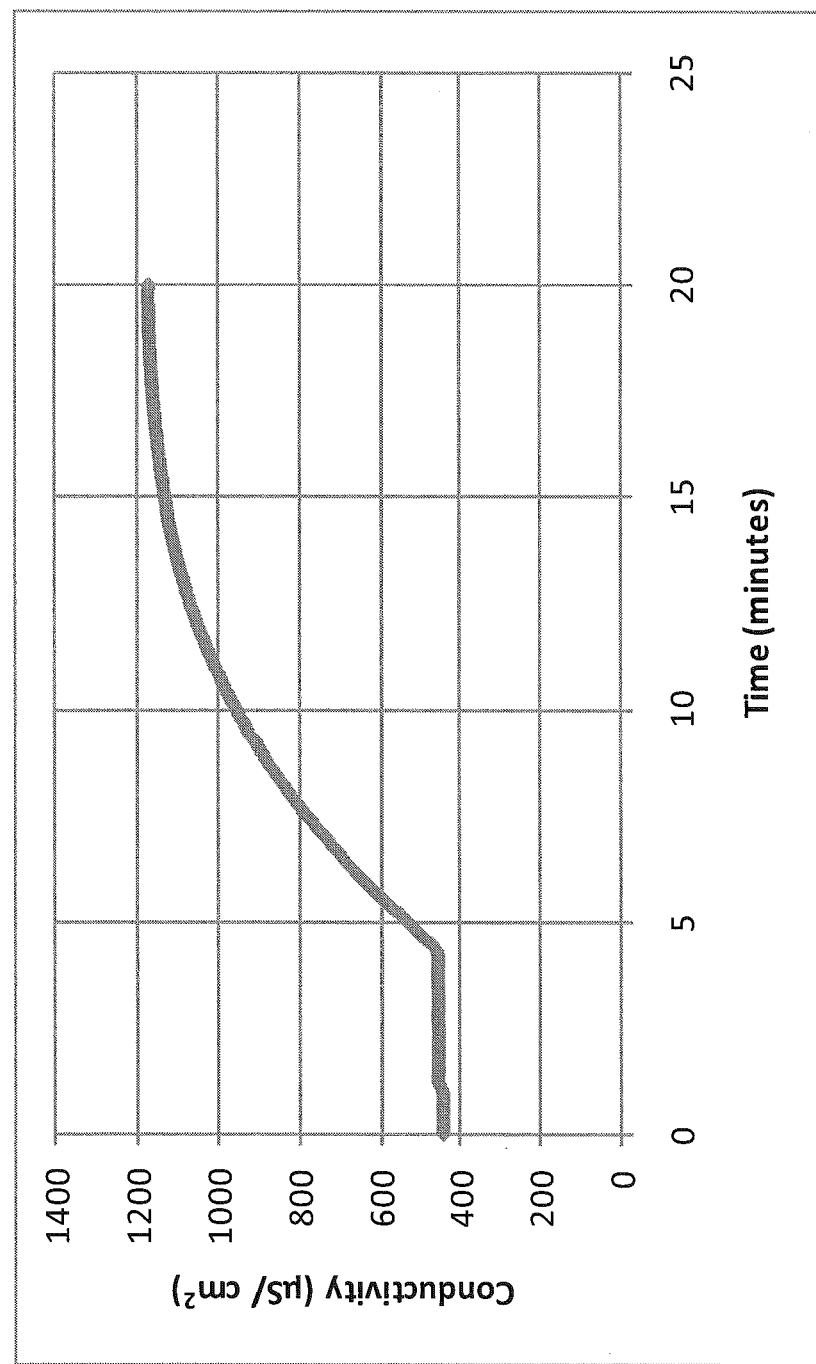
FIG. 9 is a plot of measurements of conductivity in an equimolar solution of 1,1,3,3-tetramethylguanidine and 2,2, 3,3-tetrafluorpropanol during the absorption of $CO_2$, where carbon dioxide is introduced to the mixture at approximately one minute after the beginning of the evaluation.

Absorption of $CO_2$ by an Ionic Liquid Consisting of an Equimolar Mixture of 1,1,3,3-tetramethylguanidine and 1,1,3,3-tetrafluoropropanol 1,1,3,3-tetramethylguanidine was combined with an equimolar amount of 2,2,3,3-tetrafluoropropanol, giving an exothermic reaction occurs resulting in formation of a room temperature ionic liquid, with initial conductivity equal to approximately 440 μS/cm², as shown in FIG. 9. This figure further shows that, when the ionic liquid was purged with a binary gas mixture composed of approximately 13.3% $CO_2$ (balance nitrogen), the conductivity of the solution increased to a maximum of approximately 1175 μS/cm². This data (an increase in conductivity) corresponds to the absorption of $CO_2$ by the solution as evidenced by the observed decrease in the concentration of the gas passing through the solution as followed with a $CO_2$ analyzer utilizing NDIR spectroscopy. The solution absorbed approximately 0.35 moles $CO_2$/mole of amine. When heated to approximately 80° C. under nitrogen purge, the solvent was fully regenerable, releasing all of the captured $CO_2$.

Example 3

Figure 10:
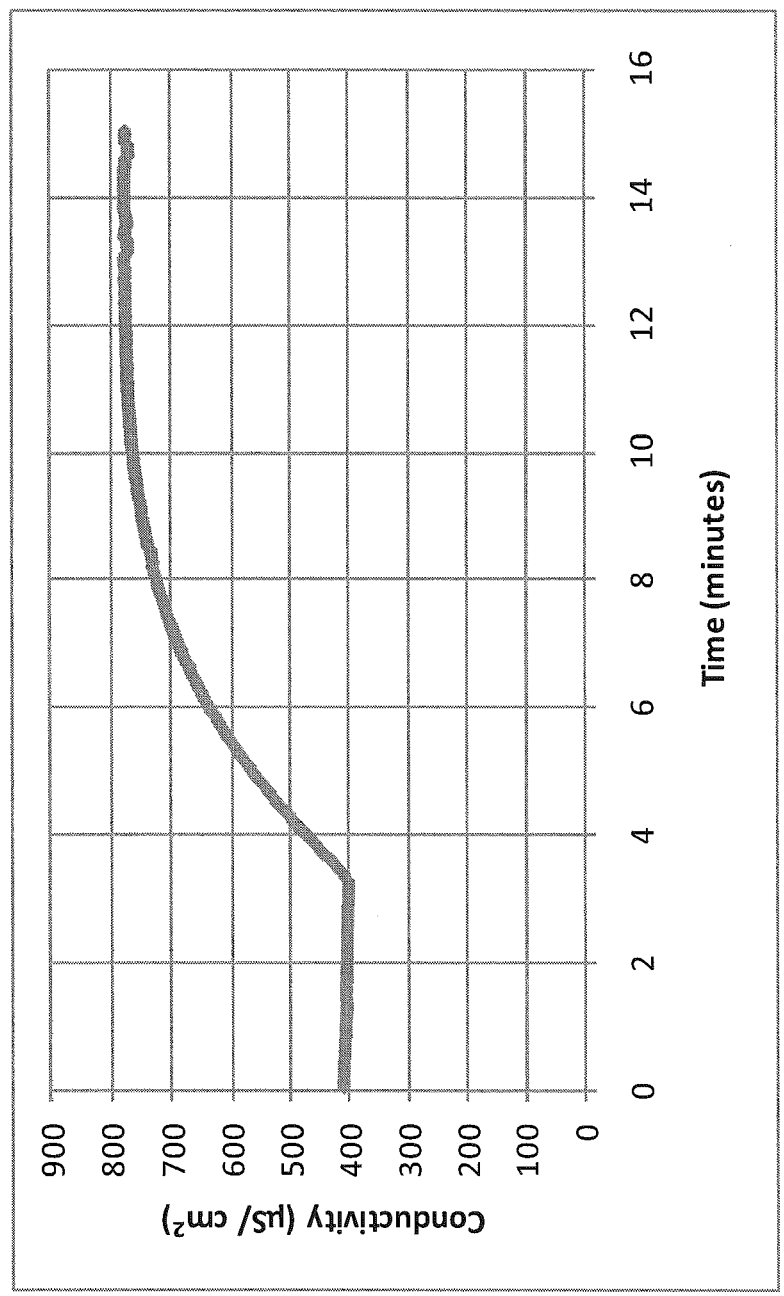
FIG. 10 is a plot of measurements of conductivity in an equimolar solution of 1,1,3,3-tetramethylguanidine and 2,2,3,3,4,4-hexafluorbutanol with absorption of $CO_2$, where the carbon dioxide is introduced to the mixture at approximately one minute after the beginning of the evaluation.

Absorption of $CO_2$ by an Ionic Liquid Consisting of an Equimolar Mixture of 1,1,3,3-tetramethylguanidine and 2,2,3,3,4,4,-hexafluorobutanol An equimolar mixture of 1,1,3,3-tetramethylguanidine with 2,2,3,3,4,4-hexafluorobutanol formed a room temperature ionic liquid is formed, with initial conductivity equal to approximately 400 μS/cm² as shown in FIG. 10. As further shown in this figure, when the ionic liquid was purged with a binary gas mixture composed approximately 13.3% $CO_2$ (balance nitrogen) the conductivity of the solution increased to a maximum of approximately 800 μS/cm$^{-1}$. This data (an increase in conductivity) shows that the solution absorbs $CO_2$ as evidenced by the observed decrease in the concentration of the gas passing through the solution as followed with a $CO_2$ analyzer utilizing NDIR spectroscopy. This indicates that the lean solvent is an ionic liquid whose conductivity increases with absorption of carbon dioxide. The solution absorbed a total of approximately 0.25 moles $CO_2$/mole amine. When heated to approximately 80° C., the solvent was fully regenerable.

Example 4

Figure 11:
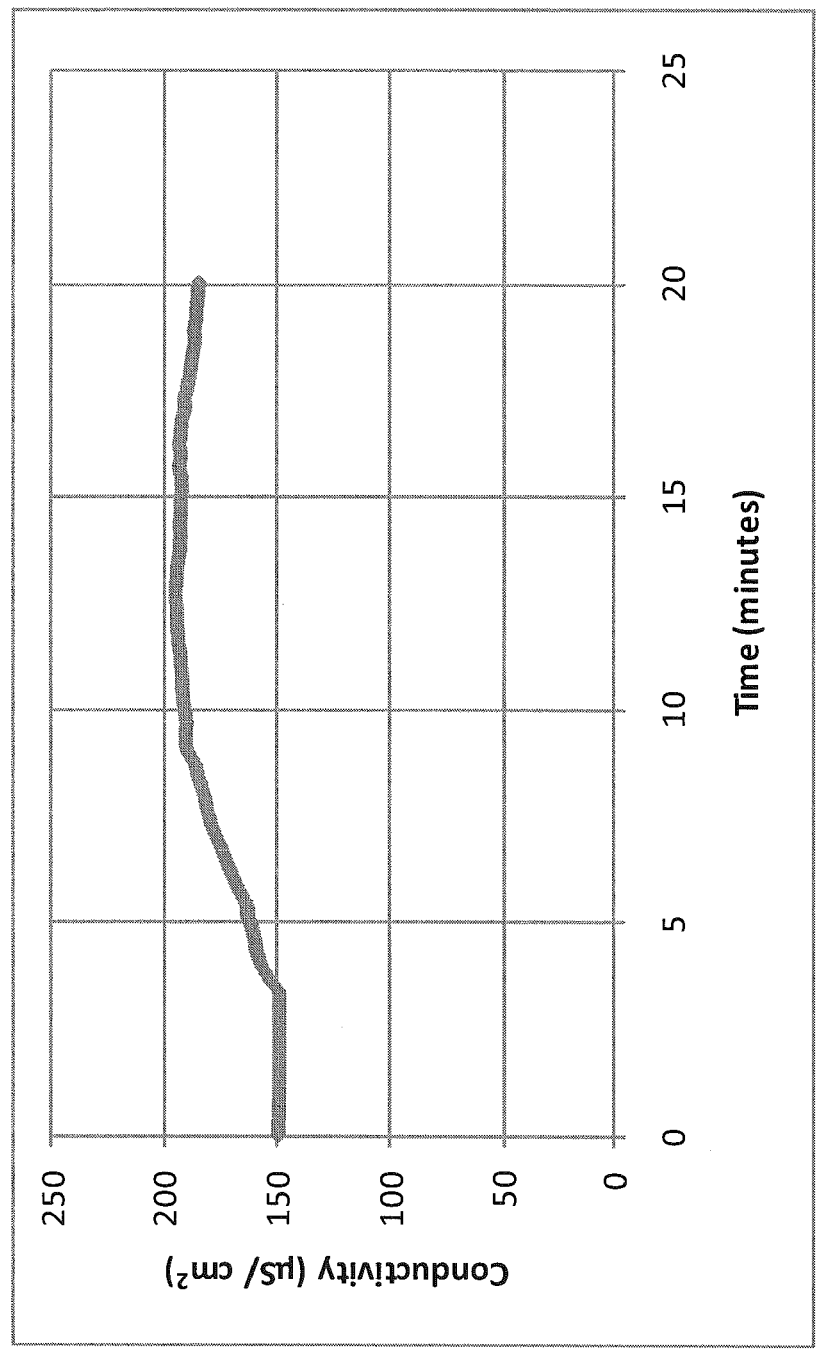
FIG. 11 is a plot of measurements of conductivity in an equimolar solution of N-tert-butyl-1,1,3,3-tetramethylguanidine and 2,2,3,3,4,4,5,5-octafluoropentanol with absorption of $CO_2$, where the carbon dioxide is introduced to the mixture at approximately one minute after the beginning of the evaluation.

Absorption of Carbon Dioxide by an Ionic Liquid Composed of N-tert-butyl-1,1,3,3-tetramethylguanidine and 2,2,3,3,4,4,5,5-octafluoropentanol An equimolar mixture of N-tert-butyl-1,1,3,3-tetramethylguanidine was combined with 2,2,3,3,4,4-hexafluorobutanol, giving a room temperature ionic liquid with initial conductivity equal to approximately 150 μS/cm² as shown in FIG. 10. The ionic liquid was purged with a binary gas mixture composed of approximately 13.3% $CO_2$ (balance nitrogen). As demonstrated in FIG. 11, the conductivity of the solution increased to a maximum of approximately 200 μS/cm². This data (an increase in conductivity) demonstrates that the solution absorbs $CO_2$ corresponding, as evidenced by the observed decrease in the concentration of the gas passing through the solution as followed with a $CO_2$ analyzer utilizing infrared spectroscopy. This indicates that the lean solvent is an ionic liquid whose conductivity increases as absorption of carbon dioxide increases. The solvent absorbed a total of approximately 0.67 moles $CO_2$/mole amine and was fully regenerable upon heating to 80° C. under nitrogen purge.

Example 5

Figure 12:
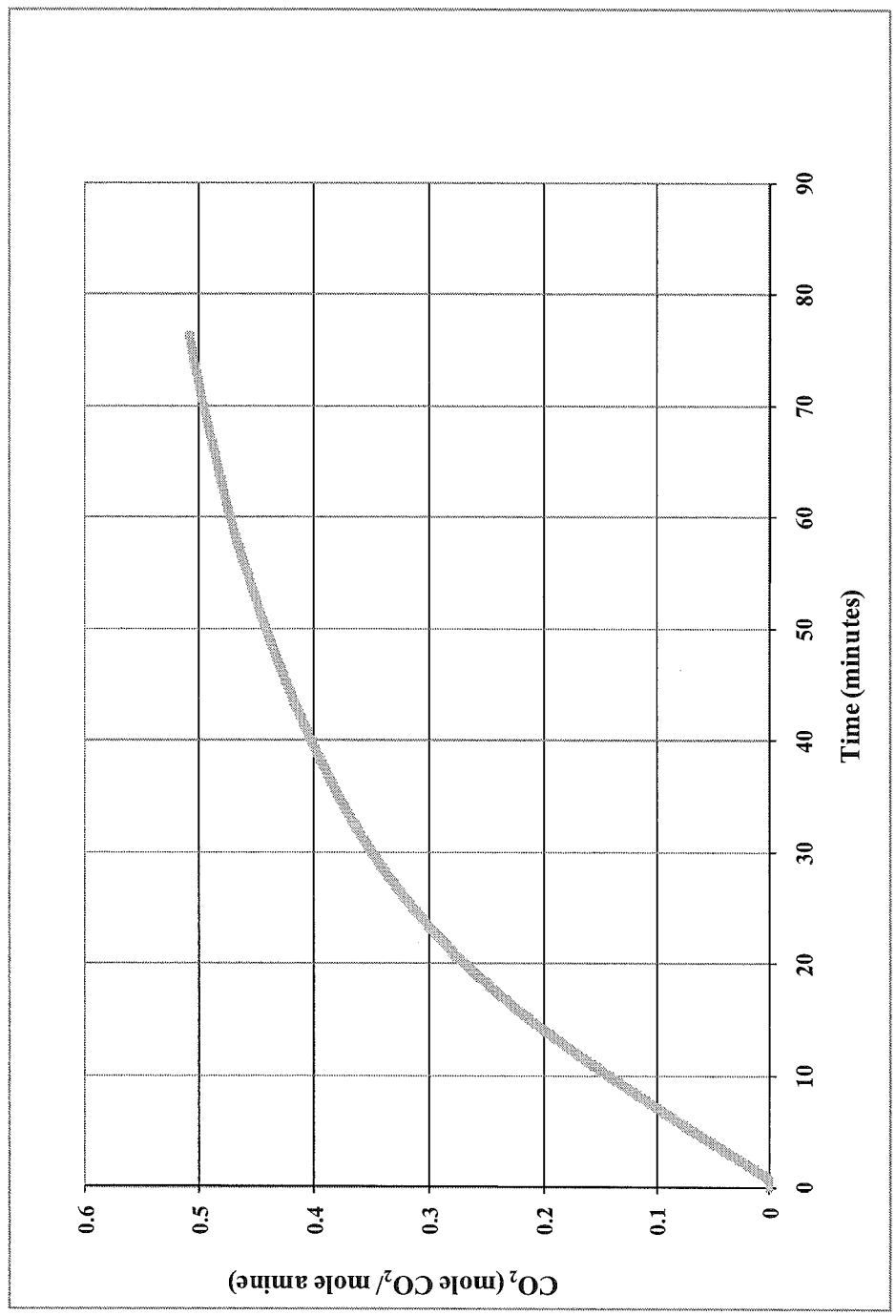
FIG. 12 is a $CO_2$ loading curve of a solvent composed of equimolar 1,8-diaza-bicyclo-undec-7-ene and 2,2,3,3-tetrafluorpropanol.

Absorption of Carbon Dioxide by an Ionic Liquid Composed of 1,8-diaza-bicyclo-undec-7-Ene ("DBU") and 2,2,3,3-tetrafluoropropanol An ionic liquid was prepared by mixing 1,8-diaza-bicyclo-undec-7-ene ("DBU") and 2,2,3,3-tetrafluorpropanol. The initial conductivity of the system was 135 μS/cm², indicating the solution as formed was a non-reversible ionic liquid. The solution was placed in an impinger and purged with a binary gas mixture containing approximately 13% $CO_2$ (balance nitrogen). The $CO_2$ concentration of the gas exiting the reactor was monitored by an NDIR $CO_2$ analyzer. The $CO_2$ loading curve is shown in FIG. 12. As shown, the solution absorbed approximately 0.56 moles $CO_2$/per mole amine and was reversible upon heating the solution to 80° C. in a flowing stream of nitrogen.

The invention claimed is:

1. A solvent system comprising an ionic liquid formed from:
   a conjugate base of an acidic component, wherein the acidic component has a pKa of less than about 15; and
   a conjugate acid of a nitrogenous base, wherein the nitrogenous base is a guanidine selected from the group consisting of N-tert-butyl-1,1,3-3-tetramethyl guanidine; diphenylguanidine, ditolylguanidine; and mixtures thereof,
   wherein the conjugate base of the acidic component has a structure such that it can react with an acidic gas so as to form a carbonate ester or a heteroatom analogue of a carbonate ester.

2. The solvent system of claim 1, wherein the acidic component is selected from the group consisting of fluorinated alcohols, optionally substituted phenols, nitrogen heterocycles, and mixtures thereof.

3. The solvent system of claim 2, wherein the acidic component is selected from the group consisting of: 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 3-fluorophenol; 3-trifluoromethylphenol; and mixtures thereof.

4. The solvent system of claim 1, wherein the ionic liquid has a conductivity greater than 100 microsiemens/cm$^2$.

5. The solvent system of claim 1, wherein the ionic liquid has a conductivity greater than 400 microsiemens/cm$^2$.

6. The solvent system of claim 1, wherein the solvent system is immiscible with water.

7. The solvent system of claim 1, wherein the solvent system has a solubility with water of less than about 10 g of solvent per 100 mL of water.

8. A process for the removal of acid gas from a gas stream, comprising contacting an acid gas-containing gas stream with a solvent system comprising the solvent system of claim 1.

9. The process of claim 8, further comprising outputting an acid gas-rich solvent and an acid-gas-lean gas stream.

10. The process of claim 9, further comprising regenerating the acid gas-rich solvent by applying heat to form a regenerated solvent comprising a lower content of acid gas than present in the acid gas-rich solvent.

11. The process of claim 10, wherein the heat applied by the regeneration component is derived from a source selected from the group consisting of low-pressure steam, hot flue gas, or a combination thereof.

* * * * *